(12) United States Patent
Church et al.

(10) Patent No.: US 11,373,042 B2
(45) Date of Patent: Jun. 28, 2022

(54) EMBEDDINGS WITH CLASSES

(71) Applicant: Baidu USA, LLC, Sunnyvale, CA (US)

(72) Inventors: Kenneth Church, Dobbs Ferry, NY (US); Hee Woo Jun, Sunnyvale, CA (US); Joel Hestness, Mountain View, CA (US)

(73) Assignee: Baidu USA LLC, Sunnyvale, CA (US)

( * ) Notice: Subject to any disclaimer, the term of this patent is extended or adjusted under 35 U.S.C. 154(b) by 387 days.

(21) Appl. No.: 16/702,299

(22) Filed: Dec. 3, 2019

(65) Prior Publication Data

US 2020/0193093 A1 Jun. 18, 2020

Related U.S. Application Data

(60) Provisional application No. 62/779,222, filed on Dec. 13, 2018.

(51) Int. Cl.

| G06F 40/20 | (2020.01) |
| G06F 40/35 | (2020.01) |
| G06F 40/279 | (2020.01) |
| G06F 40/284 | (2020.01) |
| G06T 1/20 | (2006.01) |
| G06N 5/04 | (2006.01) |
| G06N 20/00 | (2019.01) |

(52) U.S. Cl.
CPC ........... G06F 40/284 (2020.01); G06N 5/04 (2013.01); G06N 20/00 (2019.01); G06T 1/20 (2013.01)

(58) Field of Classification Search
USPC ............. 382/153–161, 187–231; 704/1–275
See application file for complete search history.

(56) References Cited

U.S. PATENT DOCUMENTS

| 2017/0162203 A1* | 6/2017 | Huang | G10L 15/193 |
| 2018/0060730 A1* | 3/2018 | Kurata | G06F 40/289 |
| 2019/0163817 A1* | 5/2019 | Milenova | G06F 16/35 |
| 2019/0279074 A1* | 9/2019 | Lin | G06N 3/0481 |

OTHER PUBLICATIONS

D. Harman, "How effective is suffixing?," Journal of the American Society for Information Science., 42:7-15, 1991. (9pgs).

(Continued)

*Primary Examiner* — Marcellus J Augustin
(74) *Attorney, Agent, or Firm* — North Weber & Baugh LLP

(57) ABSTRACT

Described herein are systems and methods for word embeddings to avoid the need to throw out rare words appearing less than a certain number of times in a corpus. Embodiments of the present disclosure involve group words into clusters/classes for multiple times using different assignments of the vocabulary words to a number of classes. Multiple copies of the training corpus are then generated using the assignments to replace each word with the appropriate class. A word embedding generating model is run on the multiple class corpora to generate multiple class embeddings. An estimate of the gold word embedding matrix is then reconstructed from multiple pairs of assignments, class embeddings, and covariances. Test results show the effectiveness of embodiments of the present disclosure.

20 Claims, 9 Drawing Sheets

(56) References Cited

OTHER PUBLICATIONS

Huang et al., "A historical perspective of speech recognition," Commun. ACM, 57(1):94-103. 2014. (11 pgs).
F.Jelinek, "Interpolated estimation of Markov source parameters from sparse data," In Proc. Workshop on Pattern Recognition in Practice, 1980. (4pgs).
F. Jelinek, "Some of my best friends are linguists," Johns Hopkins University, 2004. (25pgs).
Jiang et al.,"Semantic Similarity Based on Corpus Statistics and LexicalTaxonomy,"arXiv preprint cmp-lg/9709008, 1997. (15pgs).
S.Katz, "Estimation of probabilities fromsparse data for the language model component of a speech recognizer," IEEE transactions on acoustics, speech, and signal processing, 35(3):400-401. 1987. ( 2pgs).
Kneser et al.,"Improved backing-off for M-gram language modeling," Intr. Conf. on Acoustics, Speech, & Signal Processing, vol. 1, pp. 181-184. IEEE, 1995. (2pgs).
Levy et al.,"Neural word embedding as implicit matrix factorization," In Advances in neural information processing systems, pp. 2177-2185. 2014. (9pgs).
D. Lin"An Information-Theoretic Definition of Similarity," In ICML, vol. 98,1998. (9gps).
Prokhorov et al.,"Learning rare word representations using semantic bridging," arXiv preprint arXiv:1707.07554, 2017. (7pgs).
Radford et al.,"Improving Language Understandingby Generative Pre-Training," [online], [Retrieved Jul. 19, 2020]. Retrieved from Internet <URL: https://s3-us-west-2.amazonaws.com/openai-assets/research-covers/language-unsupervised/language_understanding_paper.pdf> 2018. (12pgs).
P. Resnik,"Using Information Content to Evaluate Semantic Similarityin aTaxonomy,"arXiv preprint arXiv:cmp-lg/9511007, 1995. (6pgs).
Saedi et al.,"WordNet Embeddings," In Proc. of the Third Workshop on Representation Learning for NLP, pp. 122-131, 2018. (10pgs).
Sun et al.,"ERNIE: Enhanced Representation through Knowledge Integration," arXiv preprint arXiv:1904.09223, 2019. (8pgs).
Wieting et al.,"CHARAGRAM: Embedding Words and Sentences via Character n-grams," arXiv preprint arXiv:1607.02789, 2016. (14pgs).
Bengio et al.,"Label Embedding Trees for Large Multi-Class Tasks," In NIPS Proceedings, 2010. (9pgs).
Banko et al.,"Mitigating the paucity-of-data problem: Exploring the effect of training corpus size on classifier performance for natural language processing," In Proc. of the 1st intr. conf. on Human language technology research, 2001. (5pgs).
Bojanowski et al.,"Enriching Word Vectors with Subword Information," arXiv preprint arXiv: 1607.04606, 2017. (12 pgs).
Chelba et al.,"One Billion Word Benchmark for Measuring Progress in Statistical Language Modeling," arXiv preprint arXiv:1312.3005, 2014. (6pgs).
Chen et al.,"An empirical study of smoothing techniques for language modeling," Computer Speech & Language, 1999. (9pgs).
Church et al.,"Word Association Norms, Mutual Information, and Lexicography," Computational linguistics, 1990. (8pgs).
Devlin et al.,"BERT: Pre-training of Deep Bidirectional Transformers forLanguage Understanding," arXiv preprint arXiv:1810.04805, 2019. (16pgs).
Gale et al.,"A Method for Disambiguating Word Senses in a Large Corpus," Computers and the Humanities, 1992. (31pgs).
Gardner et al.,"AllenNLP: A deep semantic natural language processing platform," arXiv preprint arXiv:1803.7640, 2018. (6pgs).
I. J. Good, "The population frequencies of species and the estimation of population parameters," Biometrika, vol. 40, No. 3/4, pp. 237-264, 1953 (29pgs).
C. E. Lipscomb,"Medical Subject Headings (MeSH)," Bulletin of the Medical Library Association, 88(3):265. 2000. (3pgs).
Loper et al.,"NLTK: The Natural Language Toolkit," arXiv preprint arXiv:cs/0205028, 2000. (8pgs).
M. Mahoney, "Large text compression benchmark," [online], [Retrieved Jul. 19, 2020]. Retrieved from Internet <URL:https://cs.fit.edu/~mmahoney/compression/text.html>, 2009 (39pgs.
Masoudnia et al."Mixture of experts: a literature survey," Artificial Intelligence Review, 42(2):275-293, 2012. (7pgs).
Mikolov et al."Efficient estimation of word representations in vector space," arXiv preprint arXiv:1301.3781, 2013. (12 pgs).
Mikolov et al."Distributed Representations of Words and Phrasesand their Compositionality,"arXiv preprint arXiv:1310.4546, 2013. (9pgs).
G. A. Miller, "Wordnet: a lexical database for english," Communications of the ACM, 38(11):39-41, 1995. (2pgs).
Pennington et al.,"GloVe: Global Vectors for Word Representation," In EMNLP, 2014. (12 pgs).
Peters et al.,"Deep contextualized word representations," arXiv preprint arXiv:1802.05365, 2018. (15pgs).
Pilehvar et al.,"Inducing embeddings for rare and unseen words by leveraging lexical resources," In Association for Computational Linguistics, 2017. (6pgs).

\* cited by examiner

US 11,373,042 B2

EMBEDDINGS WITH CLASSES

CROSS-REFERENCE TO RELATED APPLICATION

This application claims the priority benefit under 35 USC § 119(e) to U.S. Prov. Pat. App. Ser. No. 62/779,222, filed on 13 Dec. 2018, entitled "EMBEDDINGS WITH RANDOM CLASSES," and listing Kenneth Church, Hee Woo Jun, and Joel Hestness as inventors. The aforementioned patent document is incorporated by reference herein in its entirety.

BACKGROUND

A. Technical Field

The present disclosure relates generally to systems and methods for embedding classifications.

B. Background

For word embedding classification, pre-trained embeddings based on huge corpora may be downloaded for training purpose. However, sometimes it is desirable to train vectors on specific corpus, which may not be that large. Small counts from small corpora may be a challenge for embeddings. How can one estimate a vector for a rarely seen (or perhaps unseen) word?

Standard embedding methods, such as word2vec and GloVe, are widely cited. These methods start with a corpus and output an embedding M, a V×K matrix. The V rows in this matrix may be referred to as word vectors vec(w). There is a row for each word w in the vocabulary V. K may be referred to as the hidden dimension.

Word2vec and GloVe (with default parameter settings) remove words that appear less than 5 times. Unfortunately, many words are rare, and may be removed according to Word2vec or GloVe settings. Such removal may undesirably affect the performance of embedding classifications.

Accordingly, what is needed are systems and methods for embedding classifications that can provide improved performance, features, and uses.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments. Items in the figures are not to scale.

DETAILED DESCRIPTION OF EMBODIMENTS

Figure 1:
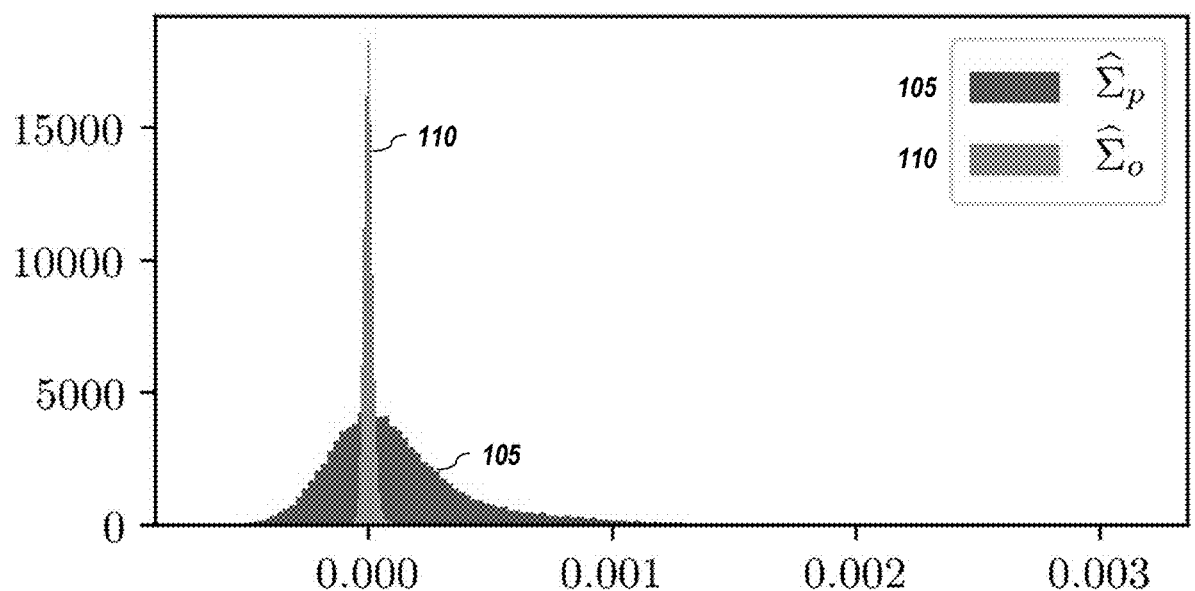
FIG. 1 depicts histograms of $\hat{\Sigma}_p$ and $\hat{\Sigma}_p$ according to embodiments of the present document.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated.

The terms "include," "including," "comprise," and "comprising" shall be understood to be open terms and any lists the follow are examples and not meant to be limited to the listed items. A "layer" may comprise one or more operations. The words "optimal," "optimize," "optimization," and the like refer to an improvement of an outcome or a process and do not require that the specified outcome or process has achieved an "optimal" or peak state.

Any headings used herein are for organizational purposes only and shall not be used to limit the scope of the description or the claims. Each reference mentioned in this patent document is incorporated by reference herein in its entirety.

Furthermore, one skilled in the art shall recognize that: (1) certain steps may optionally be performed; (2) steps may not be limited to the specific order set forth herein; (3) certain steps may be performed in different orders; and (4) certain steps may be done concurrently.

A. Introduction

For word embedding classification, pre-trained embeddings based on huge corpora may be downloaded for training purpose. However, sometimes it is desirable to train vectors on specific corpus, which may not be that large. Small counts from small corpora may be a challenge for embeddings. How can one estimate a vector for a rarely seen (or perhaps unseen) word?

Standard embedding methods, such as word2vec and GloVe, are widely cited. These methods start with a corpus and output an embedding M, a V×K matrix. The V rows in this matrix are referred to as word vectors vec(w). There is a row for each word w in the vocabulary V. K is referred to as the hidden dimension. Cosine distances $cos(vec(w_1), vec(w_2))$ may be referred to as the similarity between two words, $w_1$ and $w_2$.

Word2vec and GloVe (with default parameter settings) remove words that appear less than 5 times. Unfortunately, many words are rare, and may be removed according to Word2vec or GloVe rules. One suggestion for rare words is to group words into classes and average vectors within classes. Subword models and character models may be viewed as a special case where words are grouped together based on subwords and/or characters.

B. Related Work

It is common practice to assign words to classes based on linguistic properties such as ontologies, morphology and subword units. Some offer recent suggestions for how to combine traditional ontologies such as WordNet and MeSH with modern embeddings. This proposal is somewhat similar to an older literature on word similarity that combine WordNet with pointwise mutual information (PMI). There is a convenient WordNet interface in Natural Language Toolkit (NLTK) related to these similarity scores. Some suggest a connection between modern embeddings and PMI. Recently, Sesame Street has flooded the field with approaches that have names like: Bert, Elmo, Ernie, and GPT (Generative Pre-Training).

An interesting question, though, is whether classes should be based on linguistically motivated principles or not. There was a long debate in the Information Retrieval literature on stemming. Does it make sense to consider hostage and hostages as the same term or two different terms?

As noted by Donna Harman in "How effective is suffixing?," JASIS, 42:7-15 (1991): "Although individual queries were affected by stemming, the number of queries with improved performance tended to equal the number with poorer performance, thereby resulting in little overall change for the entire test collection." Backing off to linguistically related classes can be risky. Harman found it difficult to justify stemming. Sometimes it helps and sometimes it does not.

There are many ways to group words into classes. Instead of subwords, one might group words based on frequency. Frequency is popular in the literature on smoothing n-gram language models. In principle, all possible groupings of words into classes ought to be useful, though some might be more useful than others. Given a grouping (or a set of groupings), vectors may then be estimated for each word as some combination of the local evidence for the particular word in question, $vec_l(w)$, and the evidence aggregated over the group(s), $vec_g(w)$:

$$vec(w)=\alpha vec_l(w)+(1-\alpha)vec_g(w) \quad (1)$$

Where $\alpha$ could be defined in terms of the variance of the two estimates (or cross-validation errors to a held-out sample). Similar interpolation methods could be used to combine pre-trained models with models trained on a (smaller) corpus, that might be more relevant to a particular use case that one care about. One could imagine estimates that combine many different estimates, such as a mixture of experts. There are also, of course, many ways to combine estimates. Fine tuning has received considerable attention recently.

Embodiments of the present disclosure involve assigning words to classes n times, and then combine the n estimates in a way that takes advantage of the assignment process to figure out how to reconstruct $\hat{G}$. $\hat{G}$ is an estimate of the gold (or ground-truth) matrix, G, a V×K matrix, whose rows are the gold vectors for every word that appears in the training set at least once. In practical settings, the gold matrix G is not known, and therefore, it may be difficult to compare methods, especially when many other factors can easily dominate small differences between rival methods.

In particular, it is often said, "there is no data like more data." Collecting more data will almost always out-perform methods that try to do more with less. Nevertheless, the present disclosure would like to study small differences between methods that attempt to do more with less, because sometimes more (relevant) data are not available. One may often start with a small corpus that is relevant to a particular task. Depending on the case, it may or may not be desirable to combine what little available with other resources such as pre-trained models and other corpora.

Obviously, one can always do better with more, but how well can one do with less? Embodiments of the present disclosure estimate $\hat{G}$ on a small subset of a corpus, and see how well those estimates compare with estimates based on the entire corpus. Embodiments of the present disclosure use a simulation method where $\hat{G}$ is known, and therefore, it is easier to study subtle differences between $\hat{G}$ and $\hat{G}$, across various factors of interest such as approximations and/or parameter settings.

C. Some Rules of Thumb

In one or more embodiments, some rules of thumb listed below may be considered:

1. Averaging vectors is risky, and should be avoided whenever possible.
2. When counts are large, use them. Averaging is not necessary in this case.
3. Averaging vectors that are likely to be correlated is particularly risky, because covariances are even harder to estimate than means.
4. When averaging cannot be avoided (because counts are too small),
   (a) Do as little averaging as possible. In particular, smaller classes are better than bigger classes because more averaging is more risky than less averaging.
   (b) Design classes to make it as easy as possible to estimate covariances.

D. Notations

In one or more embodiments, the following notations are adopted in the present patent disclosure.

$\mathcal{W}$ ={the; of; and, . . . }: Vocabulary (types)

freq(w): Frequency of word w $V_{big}$=|$\mathcal{W}$|: # of words (types), typically 100k $V_{small}$ (sometimes referred as V for notation simplification): # of words (types) in a block, typically 500

C: # of classes, typically C<<V

K: # of hidden dimensions, typically 200 or 300

M: V×K embedding (from word embedding generating models, e.g. word2vec or GloVe)

G: V×K gold embedding (used in simulations)

Ĝ: V×K estimate of G (a final output)

n: # of class assignments

{$A^{(i)}$}: set of n class assignments. Each assignment is a sparse C×V matrix with V non-zero values. In one or more embodiments, rows of each assignment matrix have unit length.

{$M^{(i)}$}: set of n class embeddings. Each embedding is a C×K matrix generated by word embedding generating models, e.g. word2vec or GloVe, after replacing each word in the corpus with its class.

Σ: V×V covariance matrices. It is common practice to assume identity covariances, $\Sigma \approx \mathbb{1}$, though doing so may be risky, especially when class assignments are chosen to highlight interesting (linguistic) structure.

R: K×K rotation matrix. In one or more embodiments, the rotation matrix may be estimated using well-known methods, e.g. singular value decomposition (SVD), in solving orthogonal Procrustes problems.

T: threshold on frequency. Classes will appear at least this often (T times) in the corpus.

$\mathbb{1}_{K \times K}$: Identity matrix $1_K$: Vector of 1s

Corpus: a text, a sequence of N words, where N may typically be millions or billions. A distinction may be made between types and tokens. The vocabulary is a set of V types, and the corpus is a sequence of N tokens. For example, given the corpus, "to be or not to be," the corpus contains N=6 tokens, and the vocabulary is a set of V=4 types,{ to, be, or, not}. In one or more embodiments, types are distinct words, whereas tokens may be repeated.

E. Embodiments of Averaging Models

In one or more embodiments, averaging may be viewed as a necessary evil (for small counts). In one or more embodiments, classes may be defined to have a frequency of at least T. Assume T may be small, e.g. T=10. For rare words that appear once, T words may be grouped into a class. For words that appear twice, T/2 words may be grouped together. For words that appear three times, four such words are grouped together, and so on. Frequent words that appear T or more times may be assigned their own class. Such an embodiment of this construction is to average when small counts exist; and otherwise, it does not average and therefore avoids any potential negative effects of averaging.

In one or more embodiments, words are assigned into classes n times with n different assignment matrices, {$A^{(i)}$}. Each $A^{(i)}$ may be a sparse C×V matrix that assigns the V words in the vocabulary to C classes, where C<<V.

Conceptually, n copies of the input corpus are made, where each word is replaced with the appropriate class. In one or more embodiments, a word embedding generating model, e.g. Word2vec or GloVe, is run on each copy, to produce n class matrices, {$M^{(i)}$}. Each class matrix is a C×K matrix.

The class embeddings for rare words differ in important ways from one class embedding to the next, but for frequent words (freq(w)≥T), the class embeddings should be roughly the same up to a rotation, R. The rotations compensate for the fact that word2vec produces different embeddings, even on the same inputs, because of a race in the stochastic gradient optimization. In one or more embodiments, the Orthogonal Procrustes problem is used to estimate $R^{(i)}$ by minimizing $|M^{(0)} - M^{(i)} R^{(i)}|_F$.

The remaining challenge is to estimate Ĝ, an estimate of the V×K gold embedding, G, from n assignment matrices, {$A^{(i)}$)}, and the n class embeddings, {$M^{(i)}$}. In one or more embodiments, the estimation may be done by:

$$\hat{G} = Z \sum_{i=1}^{n} A^{(i)\top} P^{(i)} M^{(i)} R^{(i)} \qquad (2)$$

Where $P^{(i)} = (A^{(i)} \Sigma_o A^{(i)T})^{-1}$, and $$Z = \left( \sum_{p}^{-1} + \sum_{i=1}^{n} A^{(i)\top} P^{(i)} A^{(i)} \right)^{-1} \qquad (3)$$

It shall be noted that although equation (2) appears similar to a subword method that sums vector representations of n-grams, equation (2) introduces at least a couple of refinements such as Z and covariances, $\Sigma_p$ and $\Sigma_o$.

In one or more embodiments, Z may be viewed as a denominator for normalization. It shall be noted that Z does not depend on the data (assuming the estimate of $\Sigma_o$ does not depend on the data), so Z may be computed in advance, which is fortunate because the matrix inversion is the hardest part of the computation. Matrix inversion takes $O(V^3)$ time and $O(V^2)$ space, which is prohibitive for large V, unless assignment matrices are constructed to make the inversion easy (as will be discussed shortly). One could, of course, avoid matrix inversion with linear system solvers, but even so, it is worthwhile to choose convenient assignment matrices.

1. Justification for Equation (2)

In one or more embodiments, equation (2) may be derived from a simple generative model. Every time a word embedding generating model, e.g., word2vec or GloVe, is running, equation (4), a C×K class embedding matrix, $M^{(i)}$, distorted by an unknown K×K rotation matrix, $R^{(i)}$, and a V×K matrix of errors, $E^{(i)}$, is observed.

$$M^{(i)} R^{(i)} = A^{(i)} (G + E^{(i)}) \qquad (4)$$

It is assumed columns of G and $E^{(i)}$ are drawn independently and identically distributed (i.i.d.) from $|\mathcal{N}(0, \Sigma_p)$ and $\mathcal{N}(0, \Sigma_o)$, respectively, where the subscripts, p and o, refer to "prior" and "observed." In order to relate G to observed class embeddings, various linearity assumptions are introduced. In one or more embodiments, it is assumed that word embeddings have a linear structure, and noises add up in simple ways.

With $Pr(M^{(i)}|G) = Pr_F(A^{(i)} G - M^{(i)} R^{(i)})$ where each column $F_k \stackrel{i.i.d.}{\sim} \mathcal{N}(0, A^{(i)} \Sigma_o A^{(i)T})$, the maximum a posteriori probability (MAP) solution for Ĝ may be calculated with equation (2).

F. Embodiments for Estimating Covariances $\Sigma_o$ and $\Sigma_p$

As mentioned above, since covariances are challenging, simplifying approximations, such $\Sigma_o = \sigma^2 \mathbb{1}$ and $\Sigma_p = \sigma^2/\lambda \mathbb{1}$, are adopted in one or more embodiments of the present patent disclosure. But if one wanted better estimates, word2vec (or GloVe) may be run on a large corpus n times to obtain n word embeddings $\{M^{(i)}\}$, and rotate them so that they share comparable coordinates. Then, $$\hat{G} = \frac{1}{n} \sum_i M^{(i)} \tag{5}$$

$$\hat{\sum}_o = \frac{1}{nK} \sum_i (M^{(i)} - \hat{G})(M^{(i)} - \hat{G})^\top \tag{6}$$

$$\hat{\sum}_p = \frac{1}{K} (\hat{G} - \hat{\mu})(\hat{G} - \hat{\mu})^\top \tag{7}$$

where $\hat{\mu}$ is the average of columns in $\hat{G}$.

Estimates of $\Sigma_p$ computed with this method (n=32) for various subset of words show a clear block-diagonal structure in the prior covariance matrix, $\hat{\Sigma}_p$. $\Sigma_o$ estimates may be similar to the $E_p$, but histograms are different. FIG. 1 shows histogram 105 of $\hat{\Sigma}_p$ and histogram 110 of $\hat{\Sigma}_o$, and suggests that $\Sigma_p$ has more spread than $\Sigma_o$. These covariances were computed over 36k words (15% of the fil9 vocabulary, a benchmark dataset). All of these words share a 7-character initial prefix with another word.

Linguistically related words often have complicated (non-negligible) covariances. Rather than compute covariances in this way, in embodiments of the present invention, words are assigned to classes in convenient ways that avoid these complications and it is assumed that $\Sigma_o = \sigma^2 \mathbb{1}$ and $\Sigma_p = \sigma^2/\lambda \mathbb{1}$.

G. Some Simulations

The following simulation is useful for understanding equation (2), which reconstructs $\hat{G}$ from assignment matrices, $\{A^{(i)}\}$, and class embeddings, $\{M^{(i)}\}$. In the present disclosure, one or more embodiments of the proposed method are applied to corpus data, while simulation makes it easy to run lots of experiments and consider lots of what ifs. How important is Z? (Popular subword methods do not use Z). What if Z is replaced with $Z_{flat}$ (as in equation (10))? What happens as the number of words per class is increased? As mentioned above, averaging may be risky and therefore, losses should be expected with too many words per class. But simulations show that embodiments of the proposed method support more averaging than alternatives, which is convenient for rare words where averaging is a necessary evil.

For now, a simple case with an unrealistically small vocabulary of V≈500 is considered. These words will be assigned n=32 times to C=53 classes. (For convenience, C is assumed prime.) Table 1 and FIG. 3 consider a range of different values for n, C and V.

Figure 3:
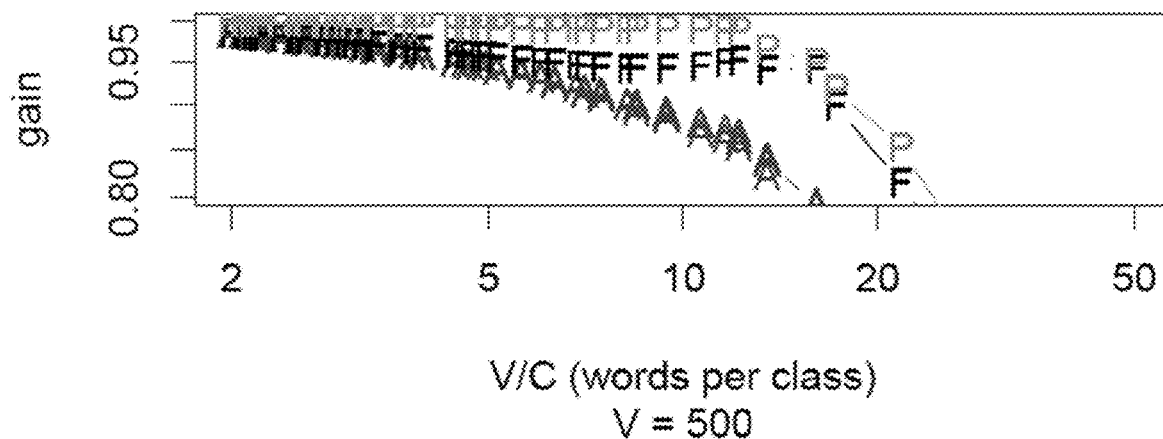
FIG. 3 depicts simulations under different numbers words per class according to embodiments of the present document.
Figure 3:
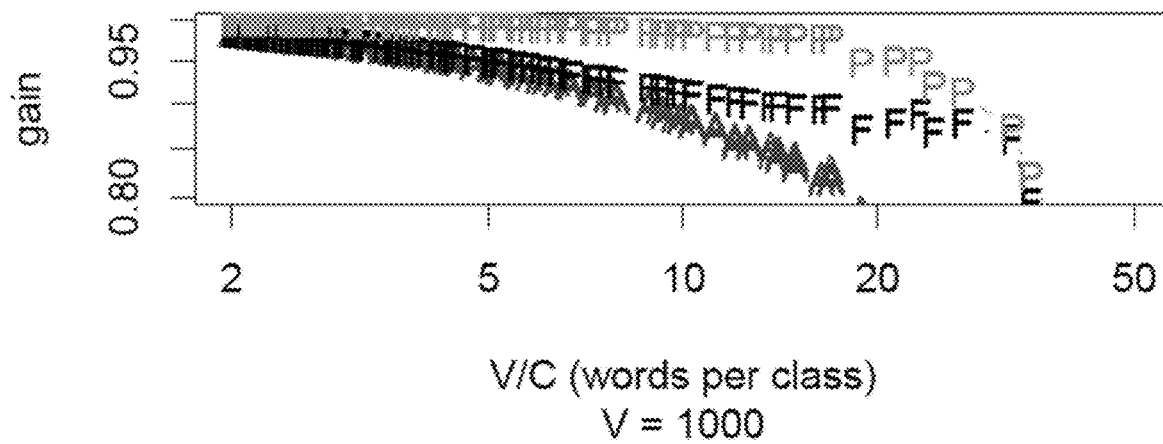

As shown in FIG. 3, the simulations show declines with too much averaging (too many words per class), but the embodiment of proposed method (line P) supports more averaging (larger gains) than the $Z_{flat}$ approximation (line F). Both are better than simple averaging (line A). Larger V supports a little more averaging (more words per class).

In one or more embodiments, T is set as 10 which means that each class (V/C) may have as many as 10 words, when all 10 words have freq=1. As for n=32, it has been discovered with simulations that distortions tend to be large when n <V/C. Larger n improve distortions, but increase computation (though there are obvious opportunities for parallelism).

TABLE 1

Simulations show that gain ≈1.0 ($\hat{G} \approx G$), at least for these inputs: n = 32, V = 500, K = 300, and 53 ≤ C ≤ 503 (where C is prime). The simulation also studies the impact of noise, σ. Obviously, it is easier to reconstruct $\hat{G}$ when there is not too much noise.

| | | Gain | | |
|---|---|---|---|---|
| C | V/C | σ = 0 | σ = 0.01 | σ = 0.1 |
| 503 | 1.0 | 1.000 | 1.000 | 1.000 |
| 251 | 2.0 | 1.000 | 0.999 | 0.884 |
| 167 | 3.0 | 0.999 | 0.993 | 0.699 |
| 127 | 3.9 | 0.998 | 0.973 | 0.487 |
| 101 | 5.0 | 0.997 | 0.964 | 0.442 |
| 89 | 5.6 | 0.996 | 0.968 | 0.479 |
| 73 | 6.8 | 0.995 | 0.983 | 0.564 |
| 67 | 7.5 | 0.994 | 0.985 | 0.609 |
| 59 | 8.5 | 0.993 | 0.986 | 0.655 |
| 53 | 9.4 | 0.992 | 0.986 | 0.676 |

In one or more embodiments, a simulation process is shown below with the simulation inputs n, C, V and K, and outputs of comparisons of G and $\hat{G}$.

1. Generate a V×K gold matrix, G, filled with random floats.
2. Create n (C×V) assignment matrices $\{A^{(i)}\}$, using the method described below.
3. Let $M^{(i)}$ be $A^{(i)}G + \sigma N^{(i)}$. For now, noise may be ignored and it is assumed that σ=0, but Table 1 shows that noise may make it harder to recover $\hat{G}$. In these simulations, $N^{(i)}$ is a Gaussian random matrix. In one or more embodiments, $M^{(i)}$ may be created by running word2vec (or GloVe) on real corpus data (after replacing words with classes).
4. Reconstruct $\hat{G}$, using equation (2).
5. Compare $\hat{G}$ with G. Find appropriate inputs (n, C, V and K) where $\hat{G} \approx G$.

1. Embodiments of Creating Assignment Matrices $\{A^{(i)}\}$

Each assignment matrix $A^{(i)}$ is a sparse C×V matrix that partitions the V words into C random classes. In one or more embodiments, C<<V.

$$A^{(i)}[c, w] = \begin{cases} \alpha & \text{if word } w \in \text{class } c, \\ 0 & \text{otherwise.} \end{cases} \tag{8}$$

In one or more embodiments, α is set such that rows of $A^{(i)}$ are unit length, e.g., the two-norm of each row as 1 with each non-zero value as $1/\sqrt{\alpha}$. It shall be noted that the assignment matrices have exactly V non-zero values since each assignment matrix assigns each word to a class. An embodiment of process for generating $A^{(i)}$ is a hashing method in Python programming language shown in Methodology 1. In Methodology 1, P is a vector of numbers (including 0, 1, and prime numbers): 0, 1, 2, 3, 5, 7, etc. In one or more embodiments, C may preferably be a prime number. One skilled in the art shall understand that the process of creating assignment matrices may be implemented via other programming languages, beside the embodiment shown in Methodology 1. Such variations shall still be within the scope of the present invention disclosure.

Methodology 1 Assigning classes

```
def word2class(V, C, i):
    # Produces a word-to-class map.
    w2c = np.zeros(V, dtype=np.int)
    words_per_class = max(2, math.ceil(V/C))
    for k in range(C):
        for j in range(words_per_class):
            o = k + j * C
            if o < V:
                w2c[o]=(k + P[j] * i) % C
    return w2c
```

In one or more embodiments, the assignment process is intended to find class assignments that are roughly the same size. In addition, class(x, i) ∩ class(x, j) should be as small as possible, where class (w, i) is the set of words in the same class as word w on the $i^{th}$ assignment.

Figure 2:
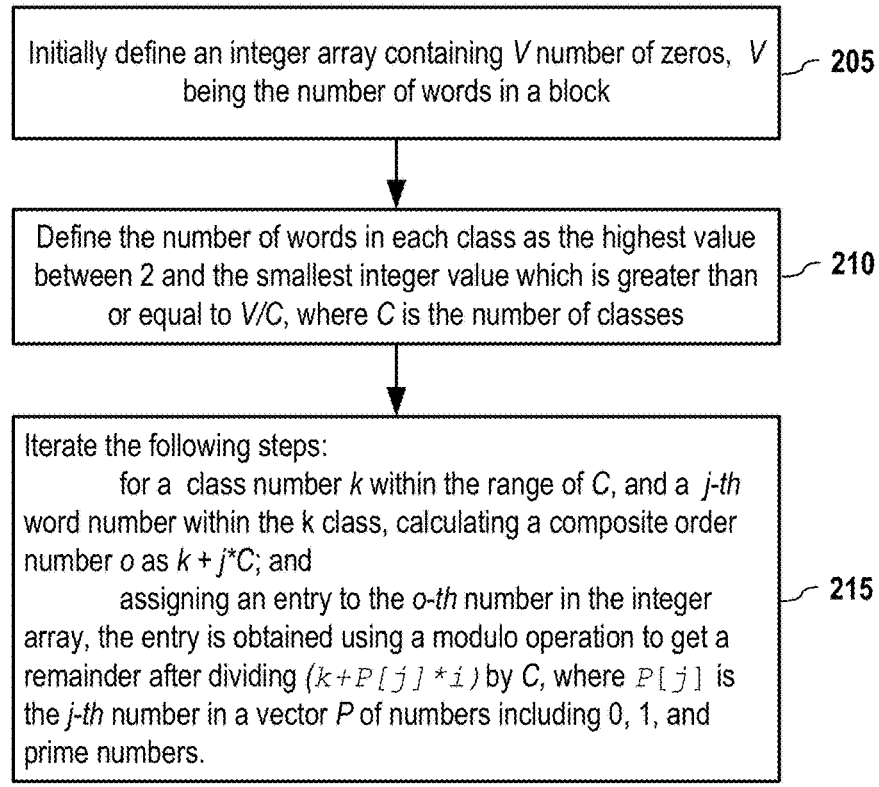
FIG. 2 depicts a hashing process for assigning words to classes according to embodiments of the present document.

FIG. 2 depicts a hashing process for assigning words to classes according to embodiments of the present document.

Initially defining (205) an integer array containing V number of zeros, V being the number of words in a block. Such a definition may be done using a function np. zeros (V, dtype=np.int) function in Python.

Defining (210) the number of word in each class as the highest value between 2 and the smallest integer value which is greater than or equal to V/C, where C is the number of classes and may be less than V. Such a definition may be done using a function max (2, math.ceil (V/C)) in Python.

Iterating (215) the following steps until the assignment is done for all the words:

for a $k^{th}$ class number within the range of C, and a $j^{th}$ word number within the $k^{th}$ class, calculating a composite order number (o), which is a sum of k and a product between j and C; and assigning an entry to the $o^{th}$ number in the integer array, the entry is obtained using a modulo operation to get a remainder after dividing (k+P[j]*i) (which is the sum of K and a product of an assignment order number i and the $j^{th}$ number within a vector P of numbers) by C, where P[j] is the $j^{th}$ number in a vector P of numbers (including 0, 1, and prime numbers): 0, 1, 2, 3, 5, 7, etc. In one or more embodiments, the modulo operation may be implemented as a Python function w2c[o]=(k+ P[j]i) % C.

2. Some Simulation Results

Simulations are convenient because G, the gold matrix, is available. In more realistic settings, G may not be available, and therefore, it is hard to know if Ĝ is close to the truth or not. Table 1 and FIG. 3 report gain(Ĝ, G) (average cosine):

$$gain(X, Y) \triangleq \frac{1}{V} \sum_w \frac{\langle X[w, \cdot], Y[w, \cdot] \rangle}{\|X[w, \cdot]\| \|Y[w, \cdot]\|} \quad (9)$$

Bigger gains are better. That is, gain≈1 when Ĝ is close to G, and gain<<1 when Ĝ is far from G. Table 1 shows gains close to 1 for a number of different values of C, indicating that equation (2) is effective, at least for these inputs (and not too much noise). It is remarkable that gains are often large, even when there are nearly 10 words in each class (V/C).

Figure 5:
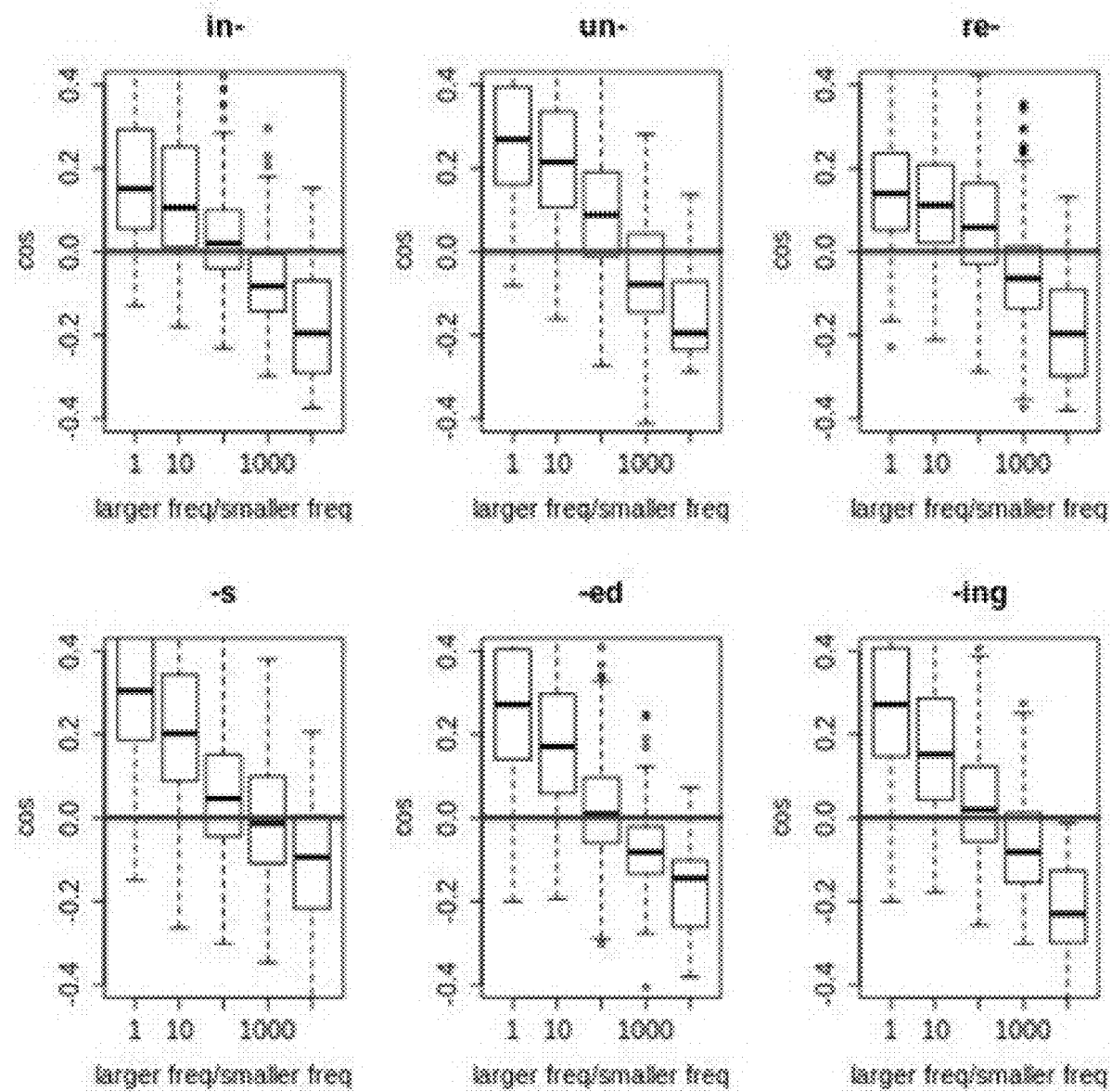
FIG. 5 graphically depicts cosine similarities for pairs under larger or smaller frequencies according to embodiments of the present document.

How many words should be assigned to each class? FIG. 5 shows one or more embodiments of the proposed method (equation (2) with $\Sigma_p^{-1} = \lambda \mathbb{1}$ and $\lambda=0.001$) may support at least 10 words per class, unlike two alternatives: flat (F) and simple averaging (A). In one or more embodiments, simple averaging is used in popular subword models: $Z^{-1} \approx \mathbb{1}$. Flat may assume equation (10), for some large constant m.

$$Z^{-1} \approx Z_{flat}^{-1} \approx \mathbb{1}/\lambda - m/(\lambda^2 mV\lambda) \quad (10)$$

In one or more embodiments, the class assignment matrix, A, may be uniformly random, $\mathbb{E}[A^T(AA^T)^{-1}A]$ works out be a flat matrix with the same values everywhere. As more experiments are run, $Z = \lambda \mathbb{1} + \Sigma_i A^{(i)T}(A^{(i)}A^{(i)T})^{-1}A^{(i)}$ resembles $\lambda \mathbb{1} + m$ for some constant m growing with n. If the matrix inversion lemma is applied to $\lambda \mathbb{1} + m = \lambda \mathbb{1} + (\sqrt{m}\mathbb{1})(\sqrt{m}\mathbb{1})^T \in \mathbb{R}^{V \times V}$, the flat approximation may be obtained.

H. Embodiments for Scaling Up to More Realistic Vocabulary Sizes

In one or more embodiments, the vocabulary size may be considerably larger than V≈500. Suppose the vocabulary is $V_{big} \approx 10^5$ or $V_{big} \approx 10^6$. Then Z in equation (2) will be $V_{big} \times V_{big}$. Inverting a matrix of that size is probably too expensive (unless the assignment matrices may be constructed to simplify the inversion).

In one or more embodiments, the vocabulary is partitioned into blocks of $V_{small} \approx 500$ words. Let $Z_{small}$ be equation (3) for blocks of $V_{small}$ words, and $Z_{big}$ be equation (3) for blocks of $V_{big}$ words. In embodiments, words within blocks may be assigned to the same class, but words from different blocks may never be assigned to the same class. Therefore, $Z_{big}$ may become a block diagonal matrix, where $Z[w_1; w_2]=0$, unless $w_1$ and $w_2$ are from the same block.

In one or more embodiments, $V_{big}$ may be an integer multiple of $V_{small}$. Then $Z_{big}$ is simply a block diagonal matrix. Each block is $Z_{small}$. Moreover, $Z_{big}^{-1}$ is also a block diagonal matrix, where each block is $Z_{small}^{-1}$. In general, $V_{big}$ may not always be a multiple of $V_{small}$, but a simple extension may use a couple of $V_{small}$ values near $V_{small}$. This approach embodiment makes it feasible to compute $Z_{big}^{-1}$, and to compute equation (2), even for large $V_{big}$.

I. Embodiments for Processing Corpus Data

Figure 4:
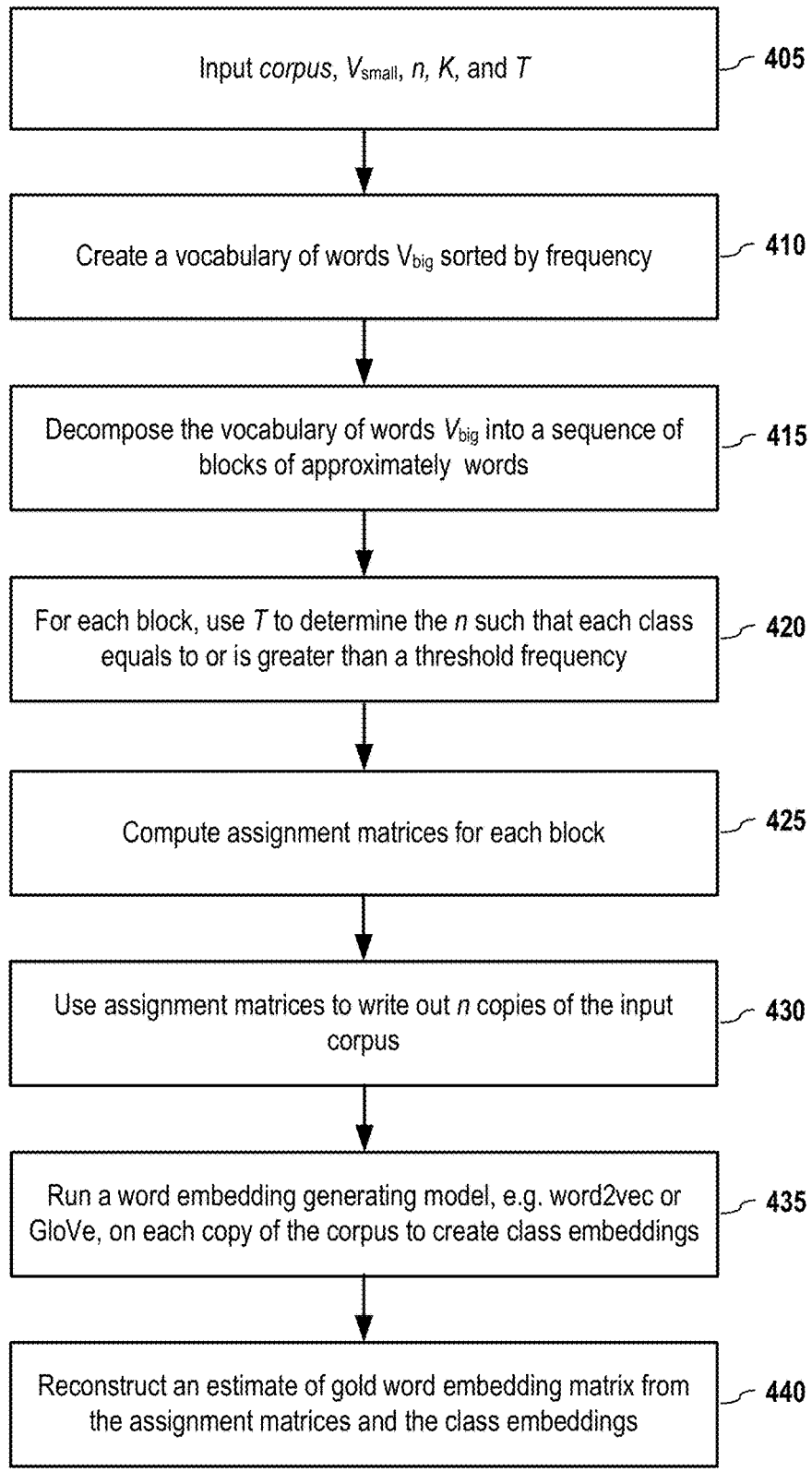
FIG. 4 depicts a process for embedding words of a corpus according to embodiments of the present document.

FIG. 4 depicts a process for embedding words of a corpus according to embodiments of the present document:

Input (405) corpus (a sequence of generally large quantity of words), $V_{small}$, n, K, and T.

Create (410) a vocabulary of $V_{big}$ words, which may be sorted by frequency.

Decompose (415) $V_{big}$ into a sequence of blocks of approximately $V_{small}$ words.

For each block, use (420) T to determine the appropriate C (# of classes) such that freq(c)≥T. That is, if the words in the block are very frequent, then each word should be in a class by itself. On the other hand, if each word appears just once, then group T words together into a class.

Use process described above, e.g. the process shown in Methodology 1, to compute (425) n assignment matrices for each block. Combine them to create $\{A^{(i)}\}$, $n(C_{big} \times V_{big})$ assignment matrices. ($C_{big}$ is the aggregate of the Cs for each block.)

Use assignment matrices to write out (430) n copies of the input corpus, where each word is replaced by the appropriate class. Classes may be implemented in different ways. In one or more embodiments, a class may be the sum or average of the vectors for each member in simulations. A scaling factor may or may not be added to the sum or average. When all vectors are unit length, the scaling factor is not very important. In one or more embodiments, for real corpora, each instance of the word is replaced with the class. For example, given a corpus "to be or not to be", the words "to" and "be" may be mapped to the same class, "to+be". The n copies of input corpus are then created, comprising the class of "to+be" and other classes that are not "to+be". In one or more embodiments, it is desirable that the class vectors may denote the centroids of the vectors for the members of the class. Embodiments of the reconstruction method are intended to reconstruct the vectors from the centroids. This may be done when n is large enough. For a system of n×C equations with V unknowns, if n×C>>V, the system of equations may be solved. For situation n×C<<V, embodiments of the reconstruction method may be useful for compression.

Run (435) a word embedding generating model, e.g. word2vec or GloVe, on each copy of the corpus to create $\{M^{(i)}\}$, $n(C_{big} \times K)$ class embeddings.

Reconstruct (440) $\hat{G}$ from $\{A^{(i)}\}$ and $\{W^{(i)}\}$, as described above, e.g., as shown in equation (2).

J. Embodiments for Not Averaging High Frequency Words with Low Frequency Words

In Section I, words are separated into separate blocks by frequency. Why this was done? Why not average vectors across different frequencies, as popular subword methods do?

It is believed that it is risky to average vectors with very different frequencies. Moreover, as suggested in the rules of thumb (Section C), when counts are large, use them. Averaging is not necessary when counts are large.

Consider the 4 pairs of words in Table 2. These words differ by an initial in-prefix. Cosines (based on fil9 corpus) are small when one word is 1000× more frequent than the other. One might hypothesize that the frequency mismatch for (in)creased and (in)stated is a clue that the spelling is misleading, and these pairs may not be considered morphologically related in the same way as (in)animate and (in)correct.

TABLE 2

Cosines are small when one word is 100x more frequent than the other (top). Cosines are larger (bold) otherwise (bottom).

| cos(x, y) | x | y | f(x) | f(y) |
|---|---|---|---|---|
| −0.21 | creased | increased | 9 | 9812 |
| 0.018 | stated | instated | 7572 | 50 |
| 0.72 | animate | inanimate | 139 | 217 |
| 0.75 | correct | incorrect | 4592 | 1358 |

FIG. 5 shows that the pattern in Table 2 holds across many more pairs. For each of 6 affixes (in-, un-, re-, -s, -ed, and -ing), pairs of words that differed by the affix in question are found. For each pair, let $f_{big}$ and $f_{small}$ be the frequencies of the two words, where $f_{big} \geq f_{small}$. The boxplots split these pairs by round($\log_{10}(f_{big}/f_{small})$). Cosines decline when one word is more frequent than the other. As shown in FIG. 5, cosines are larger for pairs with similar frequencies. When one word is 1000× more frequent than the other, the cosines are below chance (central horizontal line). When counts are large, use them (and do not average them with anything else, especially not rare words).

Based on aforementioned evidence, it was considered risky to group together words with very different frequencies (as subword methods do). It is desirable to, as much as possible, avoid averaging vectors from words with very different frequencies.

K. Some Evaluations

The point of this patent disclosure is not to produce the best possible results on end-to-end tasks, but to see if more can be done with less training data. To that end, the task is to estimate an embedding from a small corpus, and come as close as possible to a target embedding trained on more data. In embodiments, word2vec was used with default settings to compute both the baseline as well as the target. The difference is that the baseline is trained on a small corpus and the target is trained on a larger corpus. Embodiments of the proposed method is considered to be promising if performance falls between baseline and target, as in Table 3.

Table 3 shows this pattern holds for two values of T, and two pairs of corpora: (1) text8 is the first 100M characters of fil9, and (2) 1BC is the first billion characters of 1BW, the billion word benchmark. The scores are produced by the standard analogy test script included along with the word2vec (and GloVe) distributions. Embodiments of the disclosed method have fewer unknown words (OOVs) than baseline. OOVs may not be counted as incorrect by the standard analogy test script, but the script reports that the proposed method answers 6% more analogy questions than baseline for text8.

TABLE 3

Analogy test results show the performance of the proposed method falls between baseline and target for two pairs of corpora and two values of T.

| | text8/fil9 | 1BC/1BW |
|---|---|---|
| baseline | 39.9% | 59.5% |
| proposed (T = 10) | 43.6% | 62.6% |
| proposed (T = 100) | 45.0% | 61.6% |
| target | 66.1% | 66.0% |

Figure 6:
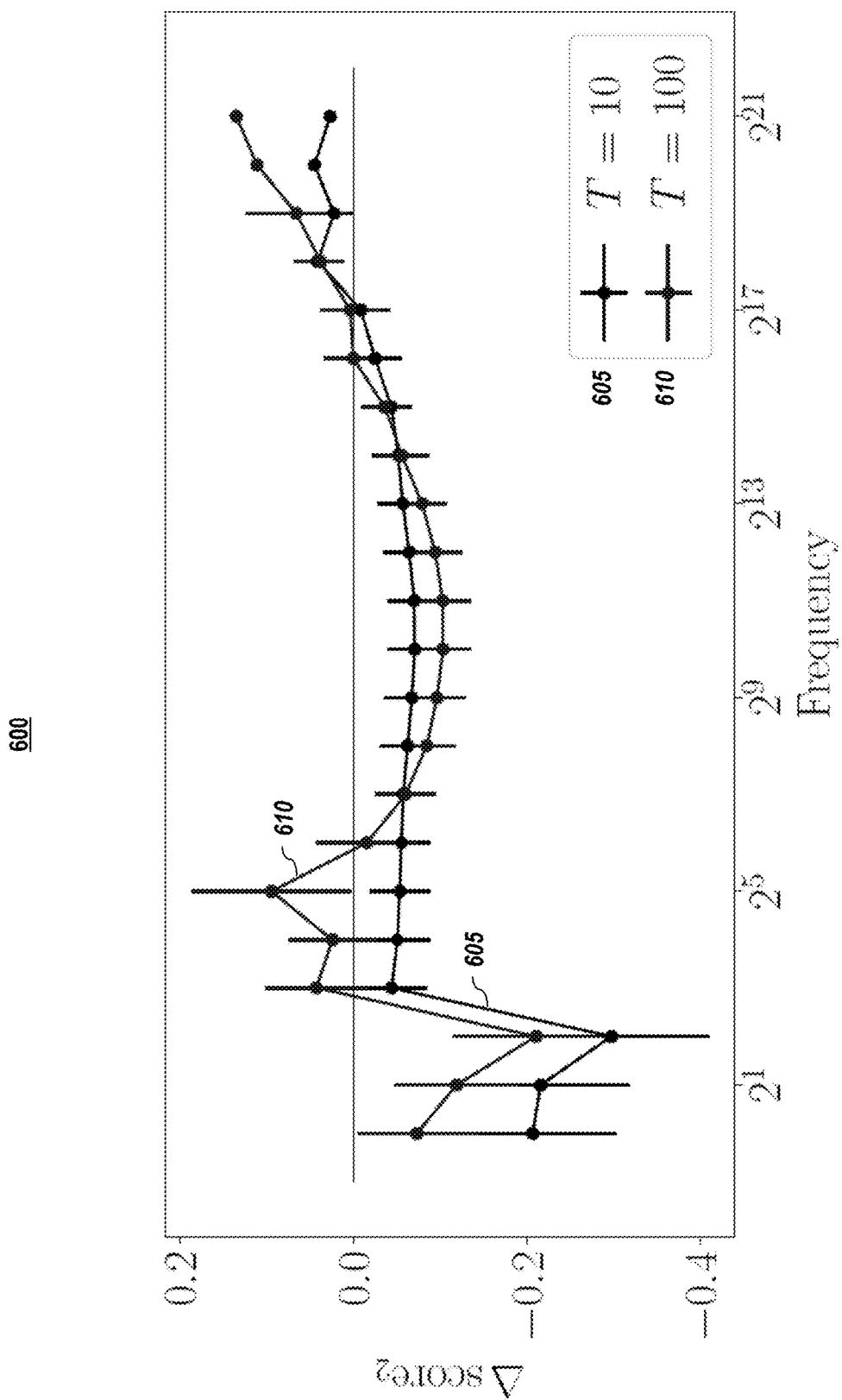
FIG. 6 depicts means and standard deviations for each bin to which words are assigned based on frequency according to embodiments of the present document.

FIG. 6 shows that the embodiment of the proposed method is particularly helpful for rare words. Let $loss_2(M_1, M_2)$ be $\|M_1 - M_2 R\|_F$ and $\Delta loss_2$ be $loss_2(M_p, M_t) - loss_2(M_b, M_t)$, where $M_b$, $M_p$ and $M_t$ are three embeddings, corresponding to baseline, proposed and target, respectively. As shown in FIG. 6, the plot shows the embodiment of the proposed method is particularly effective for rare words, and it also helps for many other words as well. Words are assigned to bins based on frequency. The plot shows means and standard deviations for each bin. Improvement over the baseline is indicated by points below the horizontal line. Line 605 shows T=10 and line 610 shows T=100. T=100 is probably averaging too much. It is desirable not doing averaging more than absolutely necessary.

FIG. 6 bins words by frequency. $\Delta loss_2$ is reported for each bin, along with error bars. Negative values ($\Delta loss_2 << 0$) indicate success for the proposed method. Rare words are particularly negative, but many other words are also negative. The proposed method with T=10 is better (more negative) than with T=100 for most words, with an exception in the middle. Under the rules of thumb mentioned above, T=100 is probably too risky. It is better not to average more than absolutely needed.

Table 4 examines a small set of V=3000 words that share the first 7 characters. The covariances are important for these words because many of them start with the same 7 characters. Words were assigned to classes in two ways: (1) first 7 characters, and (2) frequency. The two ways of assigning classes lead to large differences in gain. The diagonal approximation to the covariance degrades gain, but those differences are relatively small.

TABLE 4

There are larger differences in gain across rows than columns, indicating differences in class assignment dominate approximations of covariances. More classes result in less averaging (and better gains).

|  | full cov | diag cov |
|---|---|---|
| first 7 char (138 classes) | 0.69 | 0.67 |
| frequency (1402 classes) | 0.98 | 0.92 |

L. Some Additional Embodiments

As for efficiency, tall-skinny matrices (like embeddings) may be challenging for graphics processing units (GPUs). There may well be speed-up opportunities to replace a single tall-skinny matrix with n smaller matrices that may be processed in parallel. Additionally, modern GPUs have limited memory. Lots of smaller class embeddings are easier to work with than a single tall matrix, especially if a cluster of GPUs with enough memory is available to fit the smaller class embeddings, but not the larger word embedding. For such situations, it would be desirable to choose classes so they fit in GPU memory.

Figure 7:
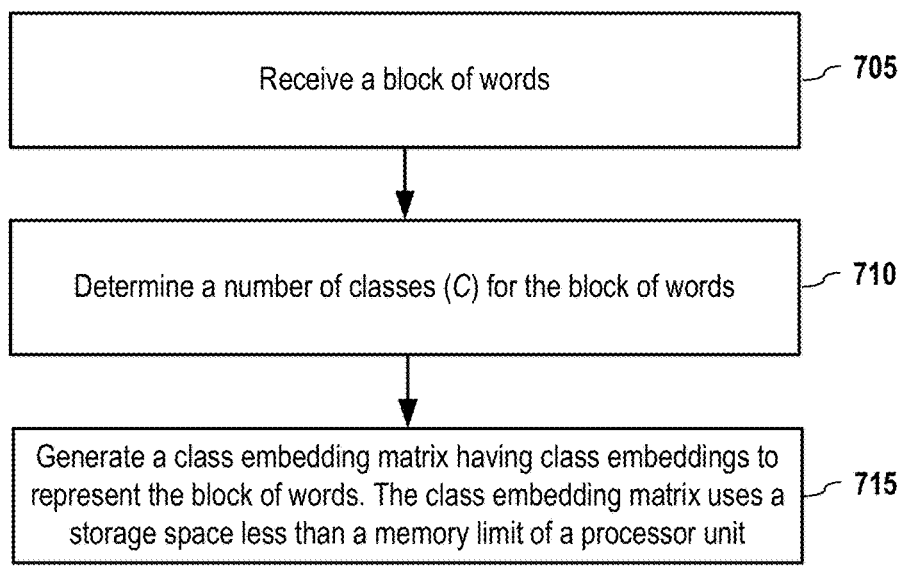
FIG. 7 depicts a process for embedding words of a corpus for parallel computing according to embodiments of the present document.

FIG. 7 depicts a process for embedding words of a corpus with class for parallel computing according to embodiments of the present document. Initially, a block ($V_{small}$) words is received (705). In one or more embodiments, the vocabulary may be sorted by frequency. A number of classes (C) is determined (710) for the block of words. A class embedding matrix having C class embeddings is generated (715) to represent the block of words. The class embedding matrix uses a storage space less than a memory limit of a processor unit. In one or more embodiments, the number of classes (C) is a prime number less than the number of words in the block. In one or more embodiments, the processor unit is a GPU. By fitting the C class embeddings within a GPU memory, parallel computation may be enabled for a cluster of GPUs with increased computation efficiency for various NLP applications, e.g. sentiment analysis, information retrieval, speech recognition, question answering etc.

In one or more embodiments, the class embedding matrix may be generated by the following processes comprising:

(1) determining a threshold on frequency T based on the number of words ($V_{small}$) in the block and the number of classes (C). In one or more embodiments, T is set as the smallest integral value greater than $V_{small}/C$. For example, when $V_{small}$=500 and C=53, then T will be 10;

(2) using process described above, e.g. the process shown in Methodology 1, computing an assignment matrix for the block. In computing assignment matrices, one or more words may be assigned to one class. For example, if a word in the block appears more than T times, then the word should be in a class by itself. On the other hand, for words appear less than T times, multiple such words may be assigned together into a class. In one or more embodiments, for a class with multiple words, each word may have the same appearance frequency;

(3) using the assignment matrix, creating a copy of the block, where in the copy of the block, each word in the block is replaced by an appropriate class; and (4) running a word embedding generating model, e.g. word2vec or GloVe, on the copy of the block to create the class embedding matrix with C class embeddings.

In one or more embodiments, embeddings with class may be applied for model compression. In order to reconstruct $\hat{G} \approx G$ well, the focus has been on cases where sufficient constraints: nC>V are available, but if one wants to compress/smooth the model, it might be desirable to use fewer parameters: nC<V. If n is smaller than necessary (n<V/C), computation space may still be saved, in a similar way as smoothing (regression), where some points are fit to a low order polynomial (e.g. a line). The line may describe the facts better than the actual points, and the residuals may be more noise than signal.

Figure 8:
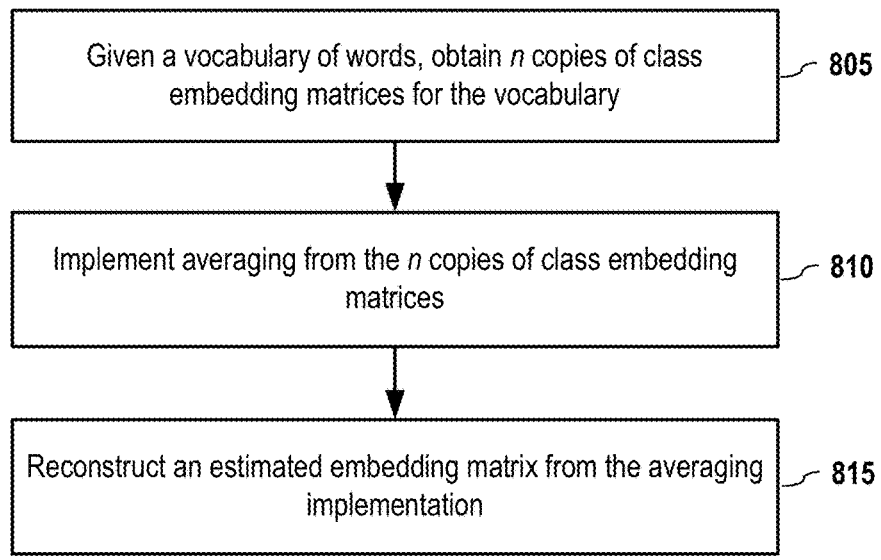
FIG. 8 depicts a process for embedding words of a corpus for model compression according to embodiments of the present document.

FIG. 8 depicts a process for embedding words of a corpus for model compression according to embodiments of the present document. Given a vocabulary of $V_{big}$ words, obtaining (805) n copies of class embedding matrices for the vocabulary. The n copies of class embedding matrices may be obtained using some of the processes shown in FIG. 4.

Equation (2) and equation (3) may be over determined or under determined depending on various parameters such as n, V and C. Much of the discussion has been focusing on the over-determined case where n>>V/C, which is desirable when well-estimating vectors are needed for rare words. In one or more embodiments, for compression, one may want to consider n<<V/C, wherein fewer parameters (less space/ more smoothing) are available. Averaging from the n copies of class embedding matrices may be implemented (810) using Equation (2) and equation (3). The implementation of averaging may be similar, to some extent, to using a polynomial in regression.

Reconstructing (815) an estimated embedding matrix for the vocabulary from the averaging implementation.

Sometimes, unknown words (OOVs) are asked. One or more embodiments may be backed off to subword units or pre-trained vectors in that case. An alternative approach may be deleted interpolation. In one or more embodiments, the training corpus may be split in two to form classes of words that appear in one piece but not the other. In one or more embodiments, vectors for these classes may be used for OOVs.

M. Some Conclusions

Typically, more data is preferred to less data; however, data can at times be limited. Similarly, there is a generally a preference for pre-trained vectors. Fine tuning is another popular option that is often effective. Embodiments of the proposed method offer more options that may be combined with one or more of the above and are useful when counts are small.

Embodiments of the methodology herein were designed to come closer to the target than the baseline. In one or more embodiments, assignment matrices, $\{A^{(i)}\}$ are used to map V words to C classes in n different ways. Conceptually, $\{A^{(i)}\}$ may be used to generate n copies of the input corpus, replacing each word with its class. Word2vec (or GloVe) may be run on these copies for generating n class embeddings $\{M^{(i)}\}$. The final result $\hat{G}$ may be reconstructed from $\{A^{(i)}\}$ and $\{^{(i)}\}$ with equation (2). While Equation (2) may appear similar to popular subword methods that average vectors over words in a class, but equation (2) introduces a few refinements such as Z and covariances, $\Sigma_p$ and $\Sigma_o$. Simulations show these refinements support more words per class. Potentially tricky covariances may be finessed by constructing $\{A^{(i)}\}$ to avoid linguistic complications as much as possible so it is safer to assume $\Sigma_o = \sigma^2 \mathbb{1}$ and $\Sigma_p = \sigma^2/\lambda \mathbb{1}$. The computation of Z may also be sped up by constructing $\{A^{(i)}\}$ with a convenient block structure. Even for rare words, averaging across blocks of $V_{small}$=500 words will not be performed.

Section C introduced a number of rules of thumb. Since averaging can be risky, in one or more embodiments, class assignments are designed to do as little averaging as possible. Alternative method embodiments are based on subwords and ontologies average frequent words with infrequent words. In one or more embodiments, words are grouped into classes so the frequency of each class is at least T. Thus, averaging may help when freq(w)<T, but will do little or no harm otherwise.

N. System Embodiments

In one or more embodiments, aspects of the present patent document may be directed to, may include, or may be implemented on one or more information handling systems/computing systems. A computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, phablet, personal digital assistant (PDA), smart phone, smart watch, smart package, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, ROM, and/or other types of memory. Additional components of the computing system may include one or more disk drives, one or more network ports for communicating with external devices as well as various input and output (I/O) devices, such as a keyboard, a mouse, touchscreen and/or a video display. The computing system may also include one or more buses operable to transmit communications between the various hardware components.

Figure 9:
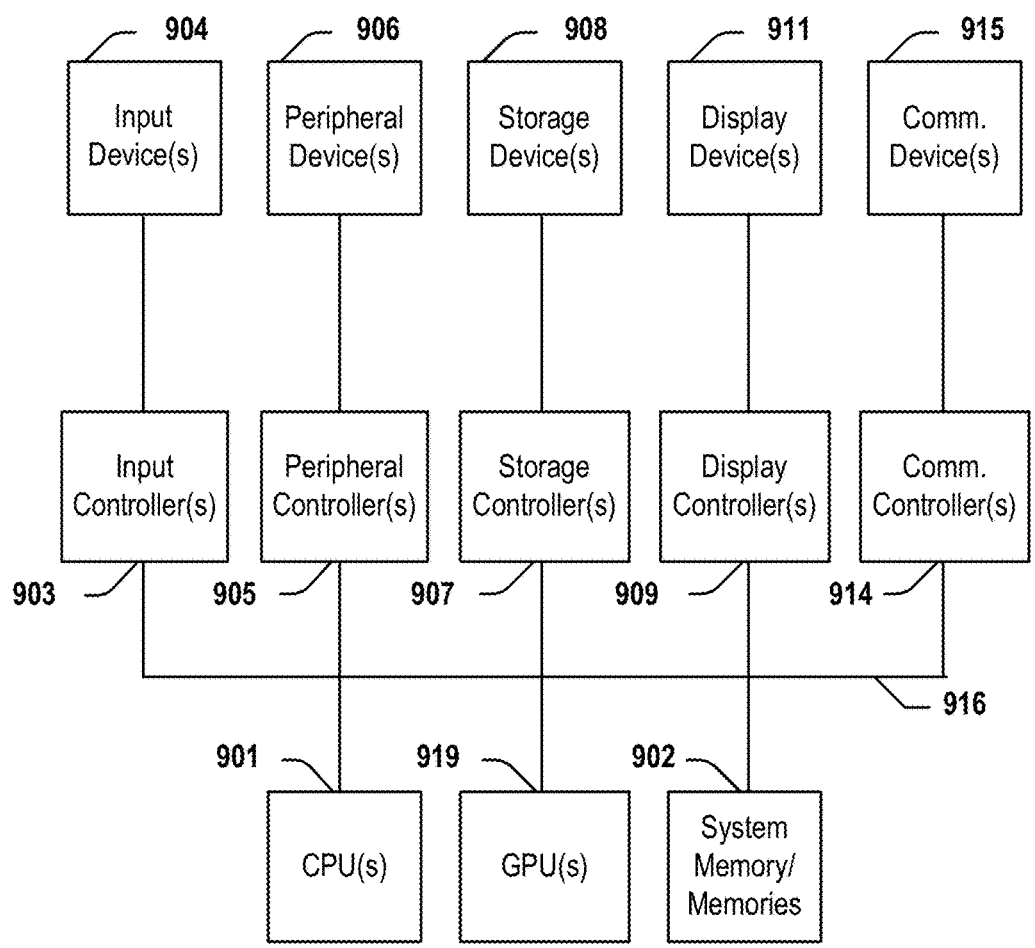
FIG. 9 depicts a simplified block diagram of a computing device/information handling system according to embodiments of the present document.

FIG. 9 depicts a simplified block diagram of a computing device/information handling system (or computing system) according to embodiments of the present disclosure. It will be understood that the functionalities shown for system 900 may operate to support various embodiments of a computing system—although it shall be understood that a computing system may be differently configured and include different components, including having fewer or more components as depicted in FIG. 9

As illustrated in FIG. 9, the computing system 900 includes one or more central processing units (CPU) 901 that provides computing resources and controls the computer. CPU 901 may be implemented with a microprocessor or the like, and may also include one or more graphics processing units (GPU) 919 and/or a floating-point coprocessor for mathematical computations. System 900 may also include a system memory 902, which may be in the form of random-access memory (RAM), read-only memory (ROM), or both.

A number of controllers and peripheral devices may also be provided, as shown in FIG. 9. An input controller 903 represents an interface to various input device(s) 904, such as a keyboard, mouse, touchscreen, and/or stylus. The computing system 900 may also include a storage controller 907 for interfacing with one or more storage devices 908 each of which includes a storage medium such as magnetic tape or disk, or an optical medium that might be used to record programs of instructions for operating systems, utilities, and applications, which may include embodiments of programs that implement various aspects of the present invention. Storage device(s) 908 may also be used to store processed data or data to be processed in accordance with the invention. The system 900 may also include a display controller 909 for providing an interface to a display device 911, which may be a cathode ray tube (CRT), a thin film transistor (TFT) display, organic light-emitting diode, electroluminescent panel, plasma panel, or other type of display. The computing system 900 may also include one or more peripheral controllers or interfaces 905 for one or more peripherals 906. Examples of peripherals may include one or more printers, scanners, input devices, output devices, sensors, and the like. A communications controller 914 may interface with one or more communication devices 915, which enables the system 900 to connect to remote devices through any of a variety of networks including the Internet, a cloud resource (e.g., an Ethernet cloud, an Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 916, which may represent more than one physical bus. However, various system components may or may not be in physical proximity to one another. For example, input data and/or output data may be remotely transmitted from one physical location to another. In addition, programs that implement various aspects of the invention may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Aspects of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A computer-implemented method for embedding words of a corpus, the method comprising:
    grouping a vocabulary of multiple words in the corpus into a set of blocks of words;
    for each block:
        selecting a number of classes such that each class appears no less than a threshold frequency in the corpus;
        in n iterations, assigning the words in the block into the number of classes to obtain n assignment matrices, n is an integer larger than 1;
    given the n assignment matrices, obtaining n input corpuses by replacing words in the corpus with its class identifier;
    obtaining n class embeddings by running a word embedding generating model on the n input corpuses; and
    reconstructing an estimated word embedding for the vocabulary based on at least the n class embeddings.

2. The computer-implemented method of claim 1 wherein the vocabulary is sorted by frequency.

3. The computer-implemented method of claim 2 wherein:
    for each block,
        assigning each word having a frequency greater than or equal to the threshold frequency of appearance in the corpus to a class by itself; and
        grouping two or more words with the appearance frequency in the corpus less than the threshold frequency together into a class.

4. The computer-implemented method of claim 1 wherein for each iteration, the assignment of words are performed to reduce intersection between words in a class across iterations.

5. The computer-implemented method of claim 4 wherein the step of assigning is performed by hashing.

6. The computer-implemented method of claim 1 wherein each assignment matrix is a sparse matrix with rows having unit length.

7. The computer-implemented method of claim 1 wherein the number of classes is a prime number.

8. The computer-implemented method of claim 1 wherein the reconstructed word embedding is an average of the n class embeddings.

9. The computer-implemented method of claim 1 wherein the reconstructed word embedding is reconstructed from an implementation of averaging from the n class embeddings, n is a number less than the number of words in the vocabulary divided by the number of classes.

10. The computer-implemented method of claim 1 wherein words from different blocks are not assigned to the same class.

11. A computer-implemented method for embedding words of a corpus comprising a number of words, the method comprising:
    in n iterations, assigning words in the corpus into a number of classes to obtain n assignment matrices, n is an integer larger than 1, the number of classes is less than the number of words in the corpus;
    given the n assignment matrices, obtaining n input corpuses by replacing words in the corpus with its class;
    obtaining n class embeddings by running a word embedding generating model on the n input corpuses; and
    reconstructing an estimated word embedding for the corpus based at least on the n assignment matrices and the n class embeddings.

12. The computer-implemented method of claim 11 further comprising:
    comparing the estimated word embedding with a ground truth embedding of the corpus for evaluation.

13. The computer-implemented method of claim 11 wherein for each iteration, the assignment of words are performed to reduce intersection between words in a class across iterations.

14. The computer-implemented method of claim 11 wherein each assignment matrix is a sparse matrix with rows having unit length.

15. The computer-implemented method of claim 11 wherein the number of classes is a prime number.

16. A computer-implemented method for embedding words of a corpus, the method comprising:
    receiving a block comprising a number of words;
    determining a number of classes for the block of words, the number of classes is less than the number of words in the block; and
    generating a class embedding matrix having the number of class embeddings to represent the block of words, the class embedding matrix uses a storage space less than a memory limit of a processor unit, the class embedding matrix is generated by:
        determining a threshold on frequency based on the number of words in the block and the number of classes;
        computing a class assignment matrix for the block to assign words in the block into corresponding classes based on an appearing frequency of each word in a corpus and the threshold on frequency;
        creating, using the class assignment matrix, a copy of the block, where in the copy of the block, each word in the block is replaced by an appropriate class; and
        running a word embedding generating model on the copy of the block to create the class embedding matrix.

17. The computer-implemented method of claim 16 wherein the processor unit is a graphic processor unit (GPU).

18. The computer-implemented method of claim 16 wherein the assignment matrix is a sparse matrix with rows having unit length.

19. The computer-implemented method of claim 16 wherein the threshold on frequency is set as the smallest integral value greater than a division result using the number of words divided by the number of classes.

20. The computer-implemented method of claim 19 wherein computing the class assignment matrix comprising:
   assigning each word having an appearing frequency greater than or equal to the threshold on frequency to a class by itself; and
   assigning two or more words having an appearing frequency less than the threshold on frequency together into a class.

\* \* \* \* \*